United States Patent
Johansson et al.

[45] 3,682,919
[45] Aug. 8, 1972

[54] PROCESS FOR THE PREPARATION OF PIPERAZINE

[72] Inventors: Jarl Harald Johansson, Vallmovagen 15; Jan Tore Tornqvist, Vitmossevagen 2, both of 444 00 Stenungsund, Sweden

[22] Filed: May 14, 1970

[21] Appl. No.: 37,309

Related U.S. Application Data

[63] Continuation-in-part of Ser. No. 655,354, July 24, 1967, abandoned.

[52] U.S. Cl........260/268 SY, 260/583 R, 260/583 P, 260/584 R, 260/585 B
[51] Int. Cl...............................................C07d 51/64

[56] References Cited

UNITED STATES PATENTS 3,068,290   12/1962   Lichtenberger et al. ...260/585

*Primary Examiner*—Alex Mazel
*Assistant Examiner*—R. V. Rush
*Attorney*—Janes & Chapman

[57] ABSTRACT

A process for preparing piperazine is provided wherein an amino compound such as amines of the general formula

X—CH$_2$CH$_2$—Y wherein X is —NH$_2$ or —OH and Y is —NH—CH$_2$—CH$_2$——NH—(CH$_2$CH$_2$NH)$_n$—H or

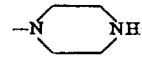

wherein n is 0 to 3 or mixtures of such amines obtained by reaction between ethylene oxide and ammonia, is heated in the presence of ammonia, if necessary, and a Ni—MgO catalyst at a temperature from about 200° to about 275° C to a percent conversion of at least 65 percent to reaction products. The reaction can be carried out in the absence of added hydrogen.

13 Claims, No Drawings

PROCESS FOR THE PREPARATION OF PIPERAZINE

This application is a continuation-in-part of Ser. No. 655,354, filed July 24, 1967, and now abandoned.

A number of processes for preparing piperazine have been proposed, such as, for example, from ethanolamines, such as mono, di- and triethanolamine, wherein the amines are heated under pressure together with ammonia and hydrogen gas in the presence of a catalyst such as a Raney-nickel catalyst, nickel, copper or cobalt, or mixtures thereof. However, the yield of piperazine obtained in such processes is less than 50 percent of the theoretical yield.

Piperazine has also been prepared from aminoethylethanolamine and diethylene triamine employing a Raney nickel catalyst. When aminoethyl ethanolamine is used, a yield of approximately 50 percent piperazine is obtained. When diethylene triamine is used, a yield of approximately 60 percent piperazine is obtained.

Accordingly, it is seen that these processes produce low yields of piperazine. A large proportion of unreacted amine is found in the reaction mixture, and a proportion of the starting amine is consumed to form less valuable by-products, which make it difficult to isolate the piperazine from the reaction mixture. These factors adversely affect the efficiency and economics of such processes.

U.S. Pat. No. 2,901,482 to MacKenzie et al. dated Aug. 25, 1959, relates to a process for preparing piperazine wherein a stream of one or more of the homologous polyamines of ethylene, particularly diethylene triamine, is passed under a pressure between 300 psi and the liquefying pressure of the reaction mixture at the reaction temperature over a fixed catalyst bed. The catalyst is Raney nickel or Raney cobalt, maintained at a temperature between 150° and 250° C. The catalyst can be supported, if desired, on a non-acidic carrier, such as inactivated nickel-aluminum alloy, charcoal and magnesium oxide, but the carrier does not constitute an active component of the catalyst because of the manner in which the catalyst is prepared.

U.S. Pat. No. 3,120,524 to Godfrey, dated Feb. 4, 1964 relates to a method for preparing N-alkyl substituted piperazines by contacting an amine with a hydrogenation catalyst in the presence of hydrogen at an elevated temperature and pressure. Hydrogenation catalysts which can be employed in the Godfrey method include metals, and oxides of copper, nickel and cobalt, including mixtures thereof, promoted, if desired, with a normally non-reducible metal oxide, such as oxides of chromium, aluminum, iron, calcium, magnesium, manganese, and the rare earths. A preferred catalyst is the mixed nickel, copper and chromium oxide catalysts. Godfrey teaches that the use of hydrogen is critical for formation of piperazines, and thus, the hydrogen should constitute at least 10 and preferably 20 to 200 atmospheres of the total pressure in the system at reaction temperatures.

U.S. Pat. No. 3,068,290 to Lichtenberger et al., dated Dec. 11, 1962 describes a catalyst for use in producing ethylene diamine from ethanolamine and ammonia, which catalyst comprises a mixture of metallic nickel and magnesium oxide. This mixed catalyst has also been employed as a catalyst in the hydrogenation of olefins and aromatic compounds.

Lichtenberger aminates monoethanolamine or ethylene oxide in liquid phase at 150° to 250° C under autogenous pressure, with anhydrous ammonia and the catalyst, to form ethylene diamine. He states that a large excess of ammonia is needed to ensure a high output of ethylene diamine. A moderate excess, two moles of ammonia per mole of monoethanolamine, aids in forming condensation products such as piperazine, by elimination of ammonia between ethylene diamine or ethylene diamine and ethanolamine molecules. However, the yields of piperazine reported by Lichtenberger are quite low, compared to ethylene diamine, and the conditions required for obtaining a good yield of piperazine are not disclosed.

In accordance with the instant invention, a process is provided for the catalytic conversion of mono- and poly-ethylene polyamines, aminoalcohols, and heterocyclic amines, (all referred to gen-erically herein as amines) and mixtures thereof, to piperazine, in good yield, which comprises heating the amines in the presence of a nickel-magnesium oxide (Ni-MgO) catalyst, under pressure, at a temperature within the range from about 200° to about 275° C, and preferably within the range from about 210° to about 250° C, until at least a 65 percent conversion and preferably an 80 percent conversion of the amine reactant to reaction products including piperazine is obtained. This process can be carried out batchwise or continuously and can give substantially higher yields of piperazine than obtained when employing the previously discussed prior art processes, which use considerably lower conversions. The maximum amine conversion shown by Lichtenberger, for example, is 60 percent. It has been determined, in accordance with the invention, that other process conditions being equal, at amine conversions below 60 percent, ethylene diamine is favored, while at amine conversions above 65 percent, piperazine is favored. The reason for this is not known. The reaction proceeds in the absence of added hydrogen.

The fact that high yields of piperazine can be obtained employing a nickel-magnesium oxide catalyst is especially surprising inasmuch as the nickel-magnesium oxide catalyst had been selected in the aforementioned preparation of ethylene diamine from ethanolamine instead of other hydrogenating catalysts, among other reasons, because it inhibits the formation of piperazine.

A further parameter favoring piperazine formation is a high reaction temperature. If ethanolamine is reacted with ammonia in the presence of Ni-MgO catalyst at temperatures within the range from about 200° to about 275° C, at a conversion above 65 percent, in accordance with the invention, a relatively high yield of piperazine is obtained, as compared to the yield obtained under the same conditions but employing temperatures of less than 200° C. That this is the case is seen from the following table which clearly shows the influence of temperature in the conversion of ethanolamine to ethylene diamine and piperazine by reaction of the ethanolamine with ammonia for three hours to an amine conversion exceeding 65 percent in the presence of Ni-MgO catalyst at the reaction temperatures indicated.

TABLE I

| Reaction Product | Percentage of reaction product, calculated in weight % on the total reaction amount at a reaction temperature of: | | |
|---|---|---|---|
| | 180°C | 200°C | 225°C |
| Ethylene diamine | 21% | 16.5% | 4 % |
| Piperazine | 11% | 31% | 55% |

The fact that higher yields are obtained when employing nickel-magnesium oxide catalysts as opposed to Raney nickel catalysts as used in prior art processes is seen from the data in Table II below.

Table II shows the net yield of piperazine in mol percent obtained from different starting materials employing Raney nickel catalysts of nickel-magnesium oxide (1:1) catalysts at various reaction temperatures and times, and an amine conversion in excess of 65%:

TABLE II

| Starting Amine | Catalyst | Temp. °C | Time Hrs. | Net yield piperazine (mol-%) | (Ex. No.) |
|---|---|---|---|---|---|
| | ( Ra Ni | 185 | * | 55 – 63 | (Control 1) |
| Diethylene | ( Ra Ni | 200 | 10 | 53 | (Control 2) |
| triamine | ( Ni-MgO | 225 | 3 | 81 | (Ex. 1) |
| | ( Ni-MgO | 250 | 1 | 81 | (Ex. 4) |
| Aminoethyl | ( Ra Ni | 200 | 3 | 50 | (Control 3) |
| ethanolamine | ( Ni-MgO | 225 | 2 | 62 | (Ex. 5) |
| | ( Ni-MgO | 250 | 1 | 70 | (Ex. 7) |
| Ethylene | ( Ra Ni | 150 | 6 | 39 | (Control 4) |
| diamine | ( Ni-MgO | 200 | 4 | 52 | (Ex. 10) |
| Mono | ( Ra Ni | 250 | 4 | 36 | (Control 5) |
| ethanolamine | ( Ni-MgO | 225 | 3 | 53 | (Ex. 11) |

*The reaction was continued until equilibrium was reached, which took about 90 hours.

The example numbers correspond to the Examples at the end of the specification.

Consequently, in the process according to the instant invention, diethylene triamine can be converted to piperazine in a net yield of more than 80 percent of the theoretical yield, in a reduced reaction time; aminoethyl ethanolamine can be converted to piperazine in a net yield of 60 to 70 percent of the theoretical yield; and monoethanolamine can be converted to piperazine in a net yield exceeding 50 percent of the theoretical yield.

Furthermore, as opposed to previously known methods for converting monoethanolamine to piperazine, the process according to the present invention can be conducted so that piperazine is formed in good yield even without adding hydrogen gas to the reaction mixture. This simplifies the process, and therefore makes it more economical to carry out. In fact, the presence of hydrogen in the instant process results in the formation of undesirable byproducts, mainly aminoethyl ethanolamine, thereby reducing the efficiency of the process.

The Ni-MgO catalyst employed in the process of the invention can be produced by coprecipitation and codecomposition in the manner described in detail in U.S. Pat. No. 3,068,290. For example, the catalyst can be formed by thermal decomposition of a coprecipitated mixture of nickel formate and magnesium formate to the oxides, followed by reduction in a hydrogen atmosphere. Furthermore, the catalyst can be produced by coprecipitating nickel and magnesium oxalate from an aqueous solution of nickel and magnesium salts, followed by thermal decomposition and reduction of the precipitated nickel-magnesium oxalate to nickel and magnesium oxide. The desired active catalyst is not obtained unless the nickel and magnesium compound precursors are brought together in the same crystal lattice or structure, before decomposition to nickel and magnesium oxide, respectively.

The ratio between nickel and magnesium oxide in the catalyst is not critical and can vary widely. The molar ratio of Ni to MgO (Ni:MgO) can be within the range from about 2:1 to about 1:2. However, optimum activity appears to be obtained at Ni:MgO of about 1:1.

The catalyst can be employed in the form of a finely divided dispersion in the reaction mixture without a support or carrier, and will display excellent activity. It can also be combined with a support or carrier material, depending upon the type of preparation and process employed. Application of a catalyst to the carrier can be effected by known methods, such as by impregnating the carrier with a solution of nickel and magnesium salts, whereupon the salts are decomposed thermally and reduced to the Ni-MgO form. Generally, from about 10 to about 95 percent of the support compound by weight of the entire catalyst composition can be employed. Where the Ni-MgO catalyst is employed in a batchwise process, a carrier is not essential. However, where a continuous process is employed, it is preferable to employ the catalyst in a mixed or fluid bed which comprises from about 40 to 95 percent by weight of a support material or carrier. Any known carrier or support materials can be employed, such as, for example, silica, alumina, zirconia, silicon carbide, alundum alumina-silica, silica gel, and the inorganic phosphates, silicates, aluminates, borates, and carbonates stable under the reaction conditions to be encountered in the use of the catalyst. Silica gel and alumina are preferred.

A mixture of the catalyst and the carrier can be compressed into a tablet form and used as such.

Amines which can be converted to piperazine in accordance with the process of the instant invention include amines of the general formula X—CH$_2$CH$_2$—Y wherein X is —NH$_2$ or —OH and Y is —NH—CH$_2$—CH$_2$—OH; —NH—(CH$_2$CH$_2$NH)$_n$—H; or

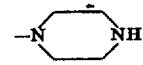

wherein n is an integer within the range from 0 to about 3, or mixtures of such amines, e.g. obtained by reaction of ethylene oxide and ammonia.

Examples of amines suitable for use as starting materials in the process of the instant invention include aliphatic aminoalcohols having from about two to about eight carbon atoms, such as mono-, di- and triethanolamine, aminoethyl ethanolamine; mono- and polyethylene polyamines having from two to about eight carbon atoms, such as ethylene diamine, diethylene triamine, triethylene tetraamine and tetraethylene pentaamine; and amino-alkyl or hydroxyalkyl piperazines having from six to about eight carbon atoms, such as aminoethyl piperazine and hydroxyethyl piperazine. In addition, mixtures of the above amines can be employed, such as, for example, mixtures of polyamines and ethanolamines may also be used, or mixtures obtained by reaction of ethylene oxide and ammonia. Accordingly, ethylene oxide and ammonia can be employed as starting materials in the process of the invention. However, the reaction speed for the formation of alkanolamines from ethylene oxide and ammonia is higher than for conversion thereof to piperazines, and thus a large amount of by-products is produced.

The concentration of the Ni-MgO catalyst employed in the reaction mixture varies depending upon whether a batchwise or continuous process is employed. Where the process of the invention is carried out batchwise, the catalyst should be employed in an amount to provide from about 1 to about 10 percent by weight metallic nickel, calculated on the weight of the starting material. If the process of the invention is carried out as a continuous process, catalyst should be present in an amount to provide a space velocity within the range from about one to about three reciprocal hours.

The space velocity is defined in the following formula:

Feed rate of amine in kg per hour/Catalyst mass in kg

In carrying out the process of the invention, whether it be batchwise or continuous, an elevated reaction temperature should be employed. Temperatures within the range from about 200° to about 275° C are suitable. Particularly good yields are obtained employing temperatures within the range from about 210° to about 250° C.

The reaction to convert the amine to piperazine is normally effected at an elevated pressure. The pressure employed is dependent upon the structure of the amine starting material, the necessity of separately supplying ammonia, and the reaction temperature. It may or may not be necessary to add ammonia to the reaction mixture, depending upon the type of amine starting material employed. Certain amines have a high nitrogen content, so that when heated they may form piperazine without an extra supply of $NH_3$. Example of such amines are ethylene diamine, diethylene triamine, triethylene tetraamine and tetraethylene pentaamine. If it is not necessary to add $NH_3$, the process may be started with a modest pressure above atmospheric, since $NH_3$ is formed during the process, and raises the pressure. Other amines require the addition of $NH_3$, and the process is therefore started at a higher pressure. Such amines are alkanolamines, such as mono- and diethanolamines and aminoethyl ethanolamine. It can therefore be generally said that the process may be effected at a pressure of within the range from about 5 to about 250 atm. It is of particular advantage that the pressure under which the major portion of the reaction is carried out is within the range from about 75 to about 200 atm.

When the reaction is conducted in the presence of ammonia, the ammonia is suitably mixed with the amine starting material and added in at least equimolar quantities with respect to the amine. Contrary to what might be expected from the Lichtenberger disclosure, a large excess of ammonia is not deleterious, and does not favor ethylene diamine formation, when the conversion exceeds 65percent. It is suitable to use an excess of ammonia corresponding to from about 2 to about 10 moles of ammonia per mole of amine, and preferably from about 2 to about 5 moles of ammonia per mole of amine. The ammonia employed for reaction with the amine need not be free from water, although dry ammonia is preferred. Ammonium hydroxide also can be employed, as a source of $NH_3$.

If the process of the instant invention is conducted batchwise, the reaction mixture including the amine and the Ni-MgO catalyst and, if necessary, ammonia, should be heated in a pressure vessel for a time within the range from about 0.1 to about 10 hours, and preferably within a range from about 1 to 5 hours, at the desired reaction temperature within the range from about 200° to about 275° C.

The process can also be carried out as a continuous process wherein the reactants in gas or liquid phase are passed under pressure over a solid catalyst bed, maintained at the desired reaction temperature. The catalyst can also be in a fluid bed, and passed countercurrently to the reaction mixture.

Any conventional high temperature pressure equipment, adapted for batch or continuous operation, can be used in carrying out the process of the instant invention. For example, in a batch process, a pressure reactor can be used, such as an autoclave equipped with an agitator and heating means.

The reaction mixture is worked up by separating the piperazine by fractional distillation. If desired, unreacted starting materials can be returned to the reaction vessel, for further use in preparing piperazine. The following Examples in the opinion of the inventors represent preferred embodiments of their invention.

EXAMPLE 1

To a 300 ml autoclave of acid-proof steel, designed for a maximum pressure of 350 atm and provided with magnetic agitating means, internal cooling coil and sample removal tube, was charged 30.3 g (0.294 mol) diethylene triamine. The air in the autoclave was displaced with nitrogen gas, and 3.24 g of a Ni-MgO (1:1) catalyst was added.

The Ni-MgO catalyst was obtained by evaporation an equimolar solution of nickel and magnesium formate, and subsequent thermal decomposition of the mixed salt in a nitrogen gas atmosphere at 330°C. The formed oxides were reduced with hydrogen gas at approximately the same temperature for about 3 hours.

Subsequent to charging the Ni-MgO catalyst the autoclave was closed and 50 g water-free ammonia (2.94 mol) was introduced through the sample removal valve. The contents of the autoclabe were heated to 225° C, with stirring, during which time the pressure rose to 190 atm. When a temperature of 225° C had been reached, a sample of the reaction mixture was drawn off, and the reaction mixture then stirred at 225° C for three hours. After each hour a fresh sample of approximately 2 ml was taken. The reaction was then halted. The samples were centrifuged to remove traces of catalyst, and were then weighed. Methanol substantially free of water was added to the samples in an amount corresponding to 4.0 ml per 5.0 g sample. 2.0 μl of the methanol solution was analyzed by gas chromatography. A Perkin-Elmer 800 Gas Chromatograph equipped with differential flash-ionization detector and double columns, 2 m in length, was used for the gas chromatographic separation. The absorbent material was Chromosorb W, impregnated with 3% KOH, as a carrier on which was applied 10 percent Carbowax 20 M.

Linear temperature programming between 100° and 200° C with a temperature gradient 6.25° C/min was used, and the flow of carrier gas comprised 80 ml $N_2$/min. Calibration of the peaks of the chromatogram were made by analysis of mixtures of known composition. The conversion degree and amount of piperazine formed were calculated from the composition of the samples, and are set out in Table III below. The following designations have been used in TABLE III:

DETA = diethylene triamine
PIP = piperazine
EDA = ethylene diamine
AEP = aminoethyl piperazine

TABLE III

| Reaction Time Hours* | Converted DETA % | % of DETA charged, recovered as: | | | | |
|---|---|---|---|---|---|---|
| | | PIP | DETA | EDA | AEP | Remainder |
| 0 | 48 | 37 | 52 | 9 | 2 | 1 |
| 1 | 89 | 68 | 11 | 12 | 3 | 6 |
| 2 | 95 | 73 | 5 | 7 | 6 | 9 |
| 3 | 97 | 81 | 3 | 4 | 7 | 6 |

*The reaction time was calculated in this and the following examples starting from the time the reaction temperature was reached.

After three hours' reaction time, the conversion was 97 percent, i.e., 97 percent of the charged amount of diethylene triamine had reacted. Of the diethylene triamine converted, 83 percent had been converted to piperazine and 17 percent to other amines. This corresponds to the formation of 20.5 g water-free piperazine (theoretical yield 25.3 g) or a net yield of piperazine of about 81 mol percent.

EXAMPLE 2

In a manner similar to that in Example 1, 30.3 g (0.294 mol) diethylene triamine was reacted with 50 g water-free ammonia (2.94 mol) in the presence of 3.24 g Ni-MgO catalyst. After three hours at 225° C, the reaction was interrupted by cooling and the contents of the autoclave were dissolved in 50 ml absolute methanol. The methanol solution was centrifuged and the product was distilled at atmospheric pressure. 19.3 g of a fraction was isolated at 145° C, which by melting point (110° C), mixture melting point with an authentic operation (110° C) and infrared spectrum was identified as piperazine. The yield comprised 76 percent of the theoretical amount. Over 65 percent of the diethylene triamine had been converted.

EXAMPLE 3

Preparation of piperazine as described in Example 1 was repeated, with the exception that the reaction was carried out at 200° C, and approximately 155 atm. After four hours' reaction time, a sample was drawn off and analyzed by gas chromatography as described in Example 1. It was determined from the composition of the sample that the percent conversion of diethylene triamine was 74 percent. Of the converted amount of diethylene triamine, 68 percent had formed piperazine, 17 percent ethylene diamine, 7 percent aminoethyl piperazine, and 8 percent other amines.

EXAMPLE 4

Preparation of piperazine as disclosed in Example 1 was repeated, with the exception that the reaction was carried out at 250° C at approximately 230 atm. After a one hour reaction time, a sample was drawn off and analyzed by gas chromatography. It was determined from the composition of the sample that the converted amount, i.e., percent conversion, of diethylene triamine was 97 percent. Of the converted amount of diethylene triamine, 83 percent had formed piperazine, 6% ethylene diamine, 5 percent aminoethyl piperazine, and 6 percent other amines. The net yield of piperazine was about 81 mol percent.

EXAMPLE 5

In a manner similar to that disclosed in Example 1, 30.6 g (0.294 mol) of aminoethyl ethanolamine was reacted at 225° C with 50.0 g (2.94 mol) water-free ammonia with 225° C and 180 atm. in the presence of 3.24 g of the Ni-MgO catalyst described in Example 1.

Samples of the reaction mixture were drawn off at different intervals and analyzed by gas chromatography as described in Example 1. The converted amount, i.e., percent conversion, of aminoethyl ethanolamine and the amounts of piperazine and other amines formed were determined from the composition of the samples. The designations AEEA and MEA indicate aminoethyl ethanolamine and monoethanolamine, respectively. The other designations are set out in Example 1.

TABLE IV

| Reaction Time Hours | Converted AEEA % | % of charged AEEA, recovered as— | | | | | | |
|---|---|---|---|---|---|---|---|---|
| | | PIP | AEEA | EDA | DETA | MEA | AEP | remainder |
| 0 | 47 | 29 | 53 | 5 | 5 | 3 | 1 | 4 |
| 1 | 83 | 56 | 17 | 8 | 2 | 3 | 7 | 5 |
| 2 | 89 | 62 | 11 | 7 | 1 | 2 | 10 | 7 |
| 4 | 91 | 61 | 9 | 3 | — | — | 15 | 13 |

After two hours' reaction time, 89 percent of the charged amount of aminoethyl ethanolamine had reacted. Thus, percent conversion was 89%. Of the converted amount of aminoethyl ethanolamine, 70 percent had formed piperazine, 11 percent aminoethyl piperazine, 8 percent ethylene diamine, and 11 percent other products. The net yield of piperazine was about 62 mol percent.

EXAMPLE 6

The preparation set forth in Example 5 was repeated, with the exception that the reaction temperature was 200° C, and the pressure 130 to 150 atm.

A sample was drawn off after five hours' reaction time, from which it was determined by gas chromatography that the converted amount, i.e., percent conversion, of aminoethyl ethanolamine was 79 percent. Of the converted amount of aminoethyl ethanolamine, 76 percent had formed piperazine, 7 percent aminoethyl piperazine, 7 percent ethylene diamine, and 10 percent other amines.

EXAMPLE 7

The preparation described in Example 5 was repeated with the exception that the reaction temperature was 250° C and the pressure 220 atm. After one hour reaction time a sample was drawn off, from which it was determined by gas chromatography that the converted amount, i.e., percent conversion, of aminoethyl ethanolamine was 85 percent. Of the converted amount of aminoethyl ethanolamine, 82 percent had formed piperazine, 6 percent aminoethyl piperazine, 6 percent ethylene diamine, and 6 percent other products. The net yield of piperazine was about 70 mol percent.

EXAMPLE 8

Using the apparatus described in Example 1, 30.9 g diethanolamine (0.294 mol) was reacted with 50 g (2.94 mol) water-free ammonia in the presence of 3.24 g of the Ni-MgO catalyst described in Example 1. The reaction took place at 225° C and the pressure obtained thereby in the autoclave comprised approximately 170 atm. The sample was removed after three hours' reaction time and analyzed by gas chromatography, as described in Example 1.

The amount of diethanolamine was determined by isothermic gas chromatography at 230° C, using in other respects the same technique as described in Example 1. From the composition of the sample, it was determined that the converted amount, i.e. percent conversion, of diethanolamine was 31 percent. Of the converted amount of diethanolamine, 47 percent had formed piperazine, 26 percent aminoethyl ethanolamine, 9 percent mono-ethanolamine, 8 percent ethylene diamine, and 10 percent other amines.

EXAMPLE 9

The preparation described in Example 8 was repeated, with the exception that the reaction temperature was 200° C and the pressure in the autoclave was 130 to 140 atm. A sample was removed after five hours' reaction time, gas chromatographic analysis of which showed that 35 percent of the charged amount of diethanolamine reacted. Of the converted amount, i.e., percent conversion, of diethanolamine, 51 percent had formed piperazine, 26 percent aminoethyl ethanolamine, 9 percent ethylene diamine, 6 percent monoethanolamine, and 8 percent other amines.

EXAMPLE 10

To the apparatus described in Example 1 was charged 76.6 g ethylene diamine (1.27 mol) and 3.5 g Ni-MgO catalyst obtained in the manner described in Example 1. The autoclave was closed and the contents therein were heated under agitation to 200° C, whereupon the working pressure had increased to 7 atm. After four hours' reaction time the pressure had increased to approximately 85 atm.

A sample was removed for gas chromatographic analysis, as described in Example 1, but in this instance linear temperature programming reaching 6.25° C/min between 90° and 200° C was applied. Determination of percent conversion from the composition of the sample showed that 92 percent ethylene diamine had reacted. Of the converted amount of ethylene diamine, 54 percent had formed 19 19percent aminoethyl piperazine, 12 percent diethylene triamine and 15 percent other products. The net yield of piperazine was about 52 mol percent.

After three more hours of reaction time, when the pressure had risen to approximately 100 atm., a fresh sample was drawn off. The composition of the fresh sample showed that 97 percent of the charged ethylene diamine had been consumed, i.e., percent conversion was 97 percent. Of the converted amount of ethylene diamine, 60 percent had formed piper-azine, 27 percent aminoethyl piperazine, 3 percent diethylene triamine, and 10 percent other products.

EXAMPLE 11

To the apparatus described in Example 1 was added 71.7 g (1.17 mol) of monoethanolamine, 4.5 g Ni-MgO catalyst, the preparation of which is described in Example 1, and 40 g (2.35 mol) water-free ammonia. The contents of the autoclave were heated to 225° C under agitation and maintained at this temperature for 3 hours, during which time the pressure in the autoclave rose to approximately 100 to 130 atm.

Chromatographic analysis of a sample of the reaction product showed that the total amount of charged monoethanolamine had reacted, i.e., a 100 percent conversion. Of the converted amount of mono-ethanolamine, 53 percent had formed piperazine, 17 percent aminoethyl piperazine, 11 percent aminoethyl ethanolamine, 4 percent ethylene diamine, and 15 percent other products.

This reaction was repeated, heating the reaction mixture at 225° C until a sample showed a % conversion of monoethanolamine of 28 percent. Analysis of the reaction mixture showed that the converted amount of monoethanolamine had formed ethylene diamine 33 percent and piperazine 8 percent. This shows the significance of a high percent conversion, exceeding 65 percent, in obtaining a high yield of piperazine.

EXAMPLE 12

The preparation described in Example 11 was repeated, with the exception that subsequent to charging monoethanolamine, Ni-MgO catalyst and ammonia, hydrogen gas was introduced into the autoclave in an amount corresponding to a pressure increase in the autoclave of approximately 15 atm. at room temperature. The reaction was then continued at 225° C for five hours. The pressure in the autoclave rose to approximately 130 to 140 atm at the end of the reaction. Gas chromatographic analysis of a sample showed that 98 percent of the charged amount of monoethanolamine had reacted, i.e., percent conversion was 98 percent. Of the converted amount of monoethanolamine, 46 percent had formed piperazine, 14 percent aminoethyl piperazine, 12 percent aminoethyl ethanol-amine, 10 percent ethylene diamine, and 18 percent other products.

EXAMPLE 13

To the apparatus described in Example 1 was charged 37.9 g (0.29 mol) of aminoethyl piperazine, 50 g (2.94 mol) ammonia and 3.2 g Ni-MgO catalyst. The reaction mixture was heated to 225° C for five hours at a pressure of approximately 170 atm. The sample was removed after five hours' reaction time. Analysis of the sample by gas chromatography to determine percent conversion showed that 37 percent of the charged amount of aminoethyl piperazine had reacted. Of the converted amount of aminoethyl piperazine, 84 percent had formed piperazine, 6 percent diethylene triamine, and 10 percent other products.

EXAMPLE 14

The preparation described in Example 13 was repeated, with the exception that the reaction took place at 250° C, at a pressure of approximately 210 atm. After five hours' reaction time a sample was drawn off which, after being analyzed by gas chromatography, showed that 63 percent of the charged amount of amine had reacted, i.e., the percent conversion was 63 percent. Of the converted amount of aminoethyl piperazine, 82 percent had formed piperazine and 18 percent other products.

EXAMPLE 15

To the apparatus described in Example 1 was charged 38.2 g (0.29 mol) hydroxyethyl piperazine, 50 g (2.94 mol) ammonia and 3.5 g Ni-MgO. The reaction mixture was heated to 250° C for about 3 hours, during which time the pressure rose to approximately 190 atm. After three hours' reaction time, a sample was drawn off which, after being analyzed by gas chromatography, showed that 31 percent of the charged amount of hydroxyethyl piperazine had reacted. Of the converted amount of hydroxyethyl piperazine, 40 percent had formed piperazine 29 percent aminoethyl piperazine, 8 percent pyrazine and 23 percent other products.

EXAMPLE 16

To the apparatus described in Example 1 was charged 50 g (1.13 mol) ethylene oxide, 164 g (9.65 mol) ammonia, and an amount of Ni-MgO which corresponded to 2 percent by weight of elementary nickel, calculated on the charged amount of ethylene oxide. For safety reasons ethylene oxide was added to the mixture of ammonia and catalyst on charging. After three hours reaction at 200° C a sample was drawn off, which showed that all the ethylene oxide had reacted. Of the charged amount of ethylene oxide approximately 15 percent had formed piperazine, whereas approximately 40 percent had formed monoethanolamine and 23 percent diethanolamine.

EXAMPLE 17

To a reactor designed for carrying out continuous reactions, comprising a 100 cm long tube of acid-proof steel with an inner diameter of 12.5 mm and a wall thickness of 2.5 mm, was charged 30 g NiO-MgO in tablet form. The tablets had been produced by compressing the mixture of non-reduced nickel oxide and magnesium oxide obtained after thermal decomposition of a nickel-magnesium formate made according to Example 1, in a tablet forming machine. The reaction tube was encased by an oil-filled jacket in which was also provided a coil for heating the charged starting material. The reaction vessel and the preheating coil were heated to the required temperature by pump circulating and electrically heating the oil.

The catalyst was reduced with hydrogen gas at 300° C for 3 hours. The mixture of starting material, namely, 52 g (0.5 mol) diethylene triamine and 85 g (5 mol) water-free ammonia, was pumped by means of a metering pump, from the bottom via the preheating coil up through the catalyst bed. The reaction temperature was maintained at 225° C and the pressure was 175 to 200 atm. 52 g (0.5 mol) diethylene triamine and 85 g (5 mol) water-free ammonia were added each hour. A gas chromatographic analysis was made of a sample of the reaction mixture, the sample showing that at a steady state, 94 percent of the charged amount of diethylene triamine had reacted, i.e., percent conversion was 94 percent. Of the converted amount of diethylene triamine, 82 percent had formed piperazine, 7 percent aminoethyl piperazine, 6 percent ethylene diamine, and 5 percent other amines.

Having regard to the foregoing disclosure, the following is claimed as the inventive and patentable embodiments thereof:

1. A process for the catalytic conversion of amine compounds having from two to about eight carbon atoms and selected from the group consisting of mono- and polyethylene polyamines, aminoalcohols, and aminoalkyl and hydroxyalkyl piperazines having the formula X—CH$_2$CH$_2$—Y, wherein X is selected from the group consisting of —NH$_2$ and —OH, and Y is selected from the group consisting of NH—CH$_2$CH$_2$—OH, —NH—(CH$_2$CH$_2$NH)n—H and

wherein n is an integer within the range from 0 to about 3, and mixtures thereof, to piperazine, which comprises heating the amine in the presence of nickel-magnesium oxide catalyst, wherein the molar ratio of Ni:MgO is within the range from about 2:1 to about 1:2, under pressure, in the absence of added hydrogen, and in the presence of ammonia at least when the amine is an amino alcohol, at an elevated temperature within the range from about 200° to about 275° C, until at least about 65 percent of the amine has been converted to reaction products, including piperazine.

2. A process as in claim 1, wherein the molar ratio of Ni:MgO is about 1:1.

3. A process as in claim 1, wherein the amine has the formula NH$_2$—CH$_2$CH$_2$—NH—(CH$_2$CH$_2$NH)$_n$—H wherein n is an integer within the range from 0 to about 3.

4. A process as in claim 1 wherein the reaction product also includes aminoethyl piperazine.

5. A process as in claim 1, wherein the amine is ethylene diamine.

6. A process as in claim 1, wherein the amine is diethylene triamine.

7. A process as in claim 1, wherein the amine is aminoethyl ethanolamine.

8. A process as in claim 1, wherein the amine is monoethanolamine.

9. A process as in claim 1, wherein the amine is diethanolamine.

10. A process as in claim 1, wherein ammonia is added to the amine compound in an amount within the range from at least an equimolar quantity with respect to the amine up to about 10 moles of ammonia per mole of amine, and the reaction is carried out at a pressure within the range from about 5 to about 250 atmospheres.

11. A process as in claim 1, wherein the amine compound is heated to a temperature within the range from about 210° to about 250° C.

12. A process as in claim 1, wherein the heating step is carried out under a pressure within the range from about 5 to about 250 atm.

13. A process as in claim 1, in which the percent conversion is in excess of 80 percent.

* * * * *

G16-097 CIP I

PO-1050
(5/69)

UNITED STATES PATENT OFFICE
CERTIFICATE OF CORRECTION

Patent No. 3,682,919      Dated August 8, 1972

Inventor(s) Jarl Harald Johansson et al.

It is certified that error appears in the above-identified patent and that said Letters Patent are hereby corrected as shown below:

| | |
|---|---|
| Face Page, Abstract, line 6 | Change "NH-CH$_2$" to -- NHCH$_2$CH$_2$OH, |
| Face Page, Abstract, line 7 | Delete "-CH$_2$-" |
| Column 2, line 19 | "gen-erically" should be -- generically -- |
| Column 10, line 14 | "19" should be -- piperazine, -- |
| Column 10, line 25 | "piper-azine" should be -- piperazine -- |
| Column 11, line 4 | "ethanol-amine" should be -- ethanolamine -- |

Signed and sealed this 10th day of April 1973.

(SEAL)
Attest:

EDWARD M. FLETCHER, JR.
Attesting Officer.

ROBERT GOTTSCHALK
Commissioner of Patents